Feb. 23, 1965 L. DAVIS 3,170,554
COIN-OPERATED SERVICE BUFFET COUNTER
Filed Sept. 24, 1962 2 Sheets-Sheet 1
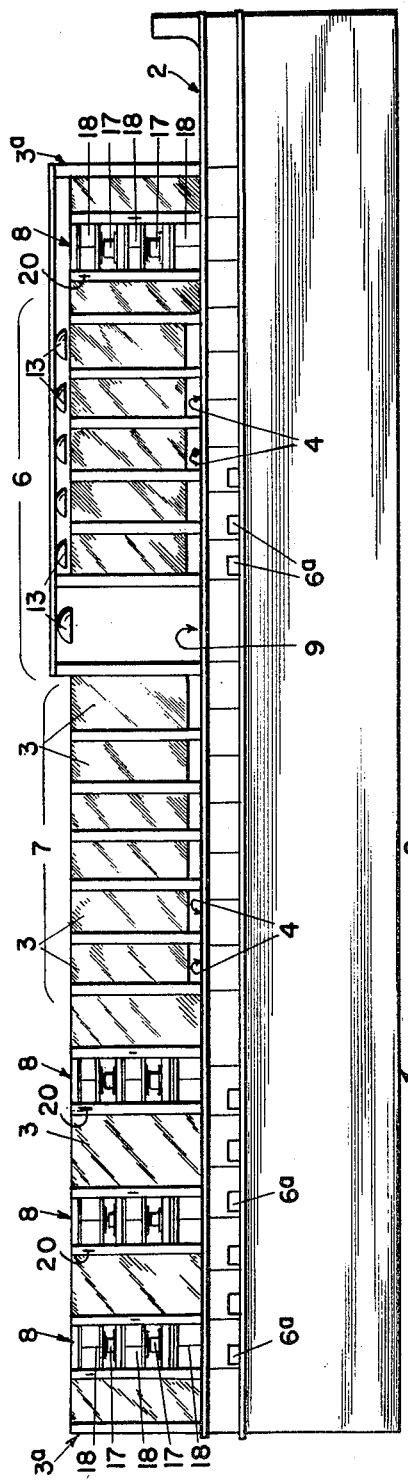
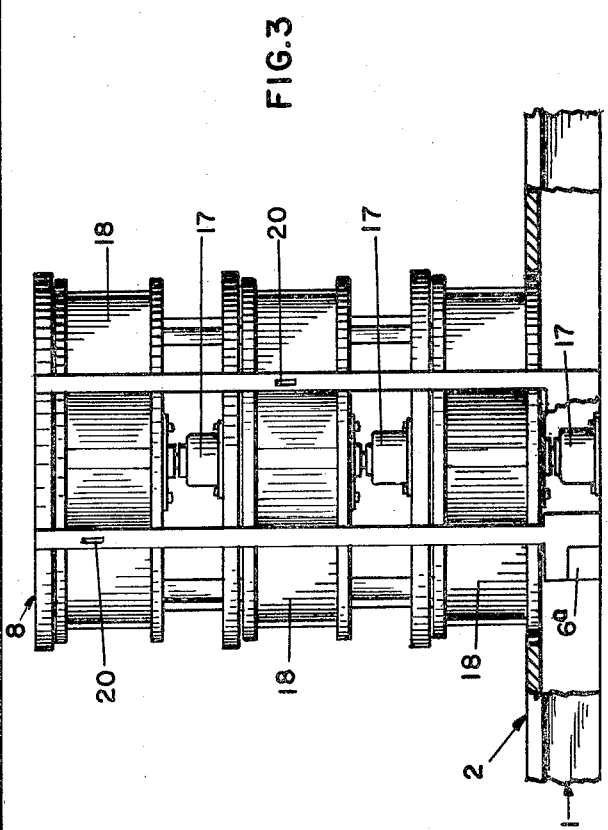
INVENTOR.
Lill Davis
BY Lyon & Lyon
ATTORNEYS Feb. 23, 1965  L. DAVIS  3,170,554
COIN-OPERATED SERVICE BUFFET COUNTER
Filed Sept. 24, 1962  2 Sheets-Sheet 2

INVENTOR.
Lill Davis
BY Lyon+Lyon
ATTORNEYS

United States Patent Office 3,170,554
Patented Feb. 23, 1965

3,170,554
COIN-OPERATED SERVICE BUFFET COUNTER
Lill Davis, 1236½ Ingraham St., Los Angeles, Calif.
Filed Sept. 24, 1962, Ser. No. 225,609
2 Claims. (Cl. 194—2)

This invention relates to food dispensing devices, and more particularly to a coin-operated buffet counter, which includes service sections and delivery or presentation sections provided for the handling of hot and refrigerated foods, and wherein each article of food as dispensed and as determined by its section is recorded in accordance with coin deposited for operation of that section to provide a simultaneous and accurate record of each class of food dispensed.

This application is a continuation-in-part of my application, Serial No. 17,510, filed March 25, 1960, and now abandoned.

In the dispensing of food in cafeteria or self-service types service, it is desirable to present to the consumer, visibly, the selections offered in a way which permits the consumer to select the items which he may desire to make up a complete meal, including the entree and vegetables, which are heated; the salad, juices, desserts, or other items which may be maintained or refrigerated. In making such visible presentation, it is desirable that it be accomplished in such a way that the same is eye appealing and in a manner such that the articles dispensed are arranged to admit of rapid service from server to consumer. It is also desirable that the service be made and that the presentation of the articles of food be presented to the consumer in open communication with the atmosphere so that the same are not subject to variations occurring in taste in articles which are confined in substantially sealed dispensing devices. It has been determined that articles of food items are most attractively presented on plates, or similar holders, and in accordance with this invention, the means for dispensing the food from the server to the consumer is dimensionally related to the plate, or holder, and quantity of food thereon which constitutes a single serving.

In accordance with my invention, the service counter, or buffet, is divided lengthwise with a transparent partition, or partitions, which provides a rear service section and a front consumer serving section. The buffet, or counter, is further provided with a heated area and a refrigerated, or cooled, area for the dispensing of heated and refrigerated food items; and each such area may be divided transversely of its length into individual dispensing areas for separate classes of food, and through which food areas the food upon plates or similar containers is passed from the receiving section to the consumer, passing either by or under the transparent partition. The operation of each dispensing is coin controlled, separately as to each conveying operation, in which a recording means is provided for recording the coins received to form a record of each class of food dispensed from the buffet.

It is, therefore, an object of my invention to provide a buffet, or counter, for the self service of food items which are freshly cooked, or prepared, and which provides a record of the total of each class of food dispensed to eliminate the possibility of errors frequently made by food checkers, cashiers, or the like.

Another object of my invention is to provide a means of dispensing food items separately where they are subject to selection by the consumer and which collectively provide a complete meal and where the food items may be freshly prepared for service and may be rapidly dispensed.

Other objects of my invention, I believe, will be obvious from the hereinafter set forth description of a preferred embodiment thereof, as illustrated in the accompanying drawings.

In the drawings:

FIGURE 1 is a diagrammatic view of a dispensing buffet, or counter, embodying my invention viewed from the front, or consumer side.

FIGURE 3 is a diagrammatic sectional view of a turret table dispenser, which may be embedded in a buffet, or counter, of my invention.

Figure 2:
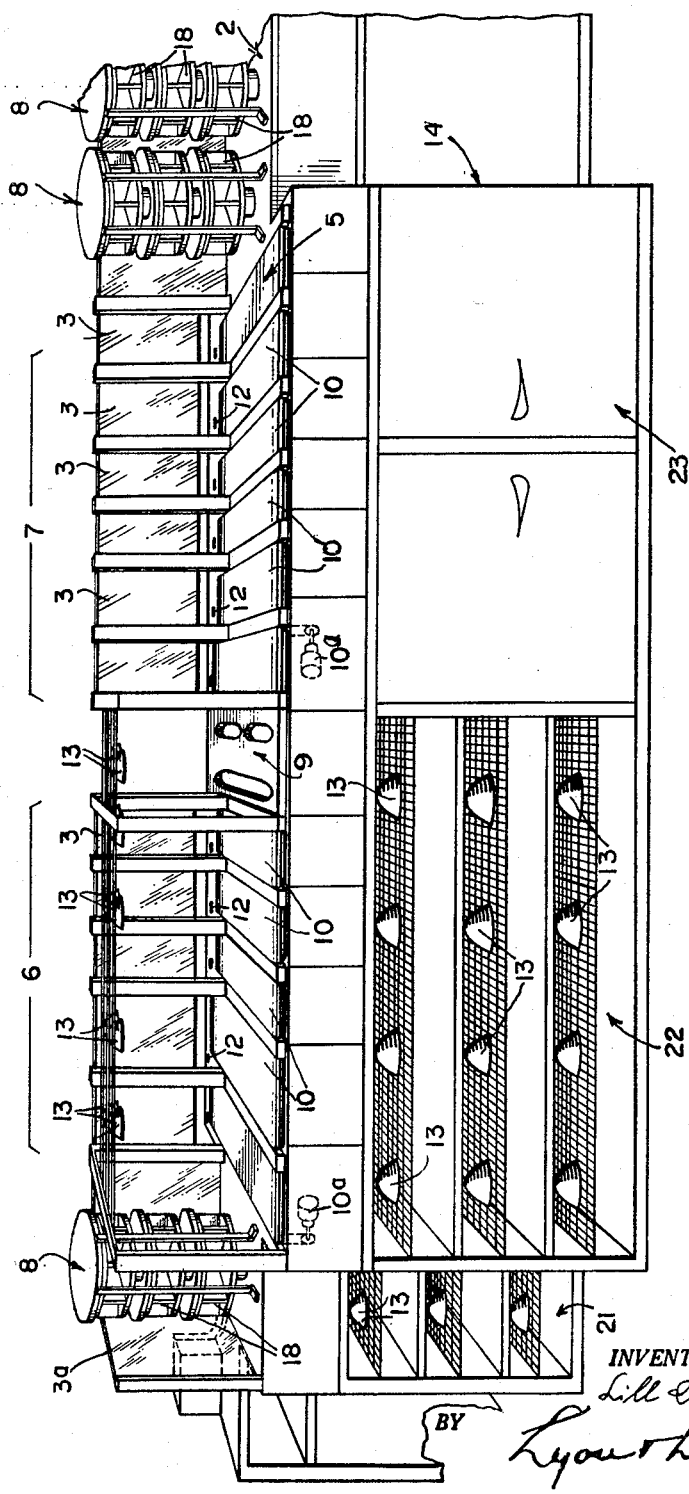
FIGURE 2 is a similar diagrammatic view, viewed from the rear, or service side.

In the preferred embodiment of my invention the food-dispensing counter may be of any desired configuration; that is, it may be straight, curved, convex, or concave, depending upon the space arrangement of room or area in which it is to be used, and the arrangement and positioning of the tables and other devices in the area.

The buffet, or counter, 1 may be of any preferred height from the floor and includes a counter 2 which is divided by a transparent partition, or partitions, 3 to form a front consumer receiving section 4 and a rear servicing section 5. It is preferable that these partitions 3 constitute the sole means of dividing the consumer section from the serving section and that the entire operation be performed in open area as distinguished from enclosures or enclosed chambers where, particularly with reference to heated foods, the same may be subject to taking on flavors or developing detrimental flavors as a result of having a multiplicity of different foods enclosed within an area.

The buffet 1 is divided transversely into a hot section 6 and a refrigerated food section 7; and to provide for the dispensing of additional food items such as juices, salads, desserts, or the like, which do not require heating or cooling for their proper serving, as illustrated, such foods may be dispensed in turret dispensers 8. For the presentation and offering of sauces, gravies, and the like, which may be desirable to the consumer for use in conjunction with the articles which he receives from the coin-operated dispensers, there is maintained a section 9 in which sauces, gravies, and the like, preferably maintained as heated, are kept for free selection by the consumer. Each of the food dispensing sections 6, 7, and 8 is provided for coin-operated dispensing of the individual food items therefrom. Each coin deposited for the operation of each dispenser is registered in a suitable counter or register 6a. Counter 6a thus counts the coins used to operate the individual dispenser, therefore, forms a record of the total number of individual items and the monies received therefrom passing through each dispenser.

The specific dispenser used in each food section may be of any suitable form and construction, and my invention is in no way dependent upon their mechanical make-up. As an example, the hot and cold food sections 6 and 7 are provided with belt conveyors 10, the width of which conveyors is related to the size of the plate or food holders to be dispensed therefrom. The belt conveyor 10 of either section may, therefore, have a width 10, 8, 6, or 4 inches, corresponding with the common dimensions of service plates used for the dispensing of entrees, vegetables, soups, or other items of food. The relating of the width of the dispensers to the size of the plates or food holders enables a material saving of space to be accomplished and at the same time assures the accurate placing of the different food items within the dispensers from the service section.

The transparent partition, or partitions, 3 may be stationary and have a lower edge spaced above the conveyor, or conveyors, a sufficient distance to permit the foods to pass thereunder, or such partitions may have movable sections which rise and fall as each food plate passes thereunder. The simple means for raising or lowering the independent glass sections of each conveyor is to provide on the conveyor spaced cam sections which ride under the glass partition 3 when the conveyor is set in motion to dispense the food, and which operate and raise the glass section or panel containing the same to permit the same to rise and fall when the plate of food has passed on the conveyor from the serving section 5 to the consumer section 4.

Each conveyor is preferably driven by an electric motor, shown at 10a, in a manner well understood in the art, and the motor is set in operation in response to a coin, or coins, inserted in appropriate coin slots 12 adjacent each conveyor.

Any suitable means may be provided for heating the food in the hot section; for example, such as the electrical resistance heating elements 13 suitably suspended over the conveyors 10.

Any suitable means may be provided for refrigerating the food in the cold section 7, such as, for example, positioning the conveyors to run over the top of a suitable refrigerator 14 having an open top, except for the closure thereof provided by the conveyors 10 of that section.

As illustrated in FIGURE 3, there may be a dispenser, or dispensers, 8 of the rotary type mounted in the counter 1. These turrets 8 may be formed in any suitable manner and include vertically spaced shelves 18 of any desired number, each of which may be rotated by its own motor 17. The rotary turrets are positioned to the rear of sections 3a of the partitions 3, so as to expose only a single segment of each shelf 18. The motor 17 is coin operated to rotate the shaft to advance segments thereof upon which the food is displayed to the consumer. A coin slot 20 is provided adjacent each shelf, and the depositing of the coin in the slot 20 completes an electric circuit to the motor to rotate the turret shaft.

In the service section 5, the food servers are located behind the partitions 3 or 3a and operate to dispense food upon the plates; and to place the same upon the required conveyors and behind each counter there is provided a cabinet, or cabinets, 21, 22, and 23, respectively, for the storage of the items of food to be dispensed in connection with the dispensers adjacent thereto. For example, the storage cabinet 21 receives for dispensing the food items to be dispensed through the rotary turret dispenser 8. The cabinet 22 is a hot cabinet, or may be an oven, or the like, from which the heated foods which are dispensed through the hot section 6 are taken for depositing upon the conveyors 10 of the hot section. Cabinet 23 may be a refrigerated cabinet from which the refrigerated food is taken for depositing upon the conveyors 10 of the refrigerated section.

The length of each conveyor is preferably such that a multiplicity of plates of food items to be dispensed thereover from plates thereon in suitably spaced relationship, which is determined primarily by the diameter of the plate upon which the food item is placed and which is also related to the width of the conveyor, sufficient spacing longitudinally of the plates on the conveyor being provided to permit separation of the plates thereon.

The increments of movement on the conveyor occasioned by the insertion of the coin in the corresponding coin slot is also related to the diameter of the plate upon the conveyor such that upon an operation of the conveyor by insertion of the coin therein, the conveyor moves from the service section to the consumer section such distance as may be required to permit the withdrawal of the plate of food from the conveyor by the consumer without permitting the withdrawal of more than one such plate.

Having fully described my invention, it is understood that the same is not to be limited to the precise details hereinabove set forth and that the same is of the full scope of the appended claims.

I claim for my invention:

1. In a service buffet and service counter, vertical means dividing a service counter into front food receiving and rear serving sections, the said dividing means having transparent portions permitting the observation from the front receiving sections of the articles served from the rear service section, said dividing means being positioned so as not to cover the food, said front and rear sections being otherwise open to the atmosphere, and a plurality of conveyors within the counter in side-by-side relationship and extending through said serving and receiving sections and below said dividing means for receiving and conveying plates of food from the service section to the receiving section past said dividing means, said conveyors being of different widths corresponding generally to the widths of the plates to be carried thereon, a coin-operated means operable from the receiving section for initiating operation of each conveyor to move a plate of food to the front receiving section from the rear serving section, and metering means for counting the coins used to initiate the operation of each conveyor.

2. In a service buffet, the combination of a counter, means dividing the counter into front receiving and rear serving sections, the dividing means including a vertical transparent partition positioned so as not to cover the food, said front and rear sections being otherwise open to the atmosphere, the counter being divided transversely of its length into hot and refrigerated food-dispensing sections; means for heating food on the heated section, means below said counter for maintaining food refrigerated for the refrigerated section, each of such sections including conveyor means extending from the food-serving to the food-receiving sections and extending through said sections and below said partition, there being a multiplicity of conveyors in each of such sections, said conveyors being of different widths corresponding generally to the width of the food receivers to be positioned thereon, each conveyor being operable to advance toward said receiving section a distance proportional to its width to thereby advance only a single food receiver to said receiving section upon each actuation, and each of said conveyors being coin operated and provided with metering means for recording the number of coins received for the operation of each conveyor of each said section.

References Cited by the Examiner
UNITED STATES PATENTS

| | | | |
|---|---|---|---|
| 1,336,628 | 4/20 | Hughes. | |
| 1,345,499 | 7/20 | Mayfarth | 221—9 |
| 1,682,827 | 9/28 | Brand. | |
| 1,734,045 | 11/29 | Parran | 221—150 |
| 2,066,865 | 1/37 | Warner | 312—98.1 |
| 2,617,267 | 11/52 | Long et al. | 312—98.1 |
| 2,740,581 | 4/56 | Komusin | 194—2 X |
| 2,831,419 | 4/58 | Timm | 221—150 |
| 2,883,027 | 4/59 | Jente. | |

SAMUEL F. COLEMAN, *Primary Examiner.*

ERNEST A. FALLER, JR., *Examiner.*